(12) United States Patent
Ge et al.

(10) Patent No.: US 10,419,349 B2
(45) Date of Patent: Sep. 17, 2019

(54) CONGESTION METHOD, DEVICE AND SYSTEM

(71) Applicant: Huawei Technologies Co., Ltd., Shenzhen (CN)

(72) Inventors: Wenmin Ge, Shenzhen (CN); Zhefeng Yan, Shenzhen (CN); Rong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 796 days.

(21) Appl. No.: 14/983,184

(22) Filed: Dec. 29, 2015

(65) Prior Publication Data

US 2016/0134540 A1 May 12, 2016

Related U.S. Application Data

(63) Continuation of application No. PCT/CN2014/079907, filed on Jun. 16, 2014.

(30) Foreign Application Priority Data

Jul. 3, 2013 (CN) .......................... 2013 1 0277336

(51) Int. Cl.
*H04L 12/801* (2013.01)
*H04L 12/64* (2006.01)
(Continued)

(52) U.S. Cl.
CPC .......... *H04L 47/12* (2013.01); *H04L 12/6418* (2013.01); *H04L 12/66* (2013.01);
(Continued)

(58) Field of Classification Search
CPC ... H04L 47/12; H04L 67/327; H04L 67/2842; H04L 12/6418; H04L 12/66; H04L 47/30; H04L 47/26; H04L 47/17
See application file for complete search history.

(56) References Cited

U.S. PATENT DOCUMENTS

2006/0215550 A1* 9/2006 Malhotra ................ H04L 47/10
370/229
2007/0081454 A1 4/2007 Bergamasco et al.
(Continued)

FOREIGN PATENT DOCUMENTS

CN 1642131 A 7/2005
CN 101005336 A 7/2007
(Continued)

OTHER PUBLICATIONS

Rozhnova et al., "An effective hop-by-hop Interest shaping mechanism for CCN communications," 2012 IEEE Conference on Computer Communications Workshops (INFOCOM WKSHPS), Orlando, Florida, pp. 322-327, Institute of Electrical and Electronics Engineers, New York, New York (Mar. 25-30, 2012).
(Continued)

*Primary Examiner* — Pao Sinkantarakorn
*Assistant Examiner* — Kabir U Jahangir
(74) *Attorney, Agent, or Firm* — Leydig, Voit & Mayer, Ltd.

(57) ABSTRACT

Provided are a congestion control method, device and system. The congestion control method includes: receiving, by a source device, through a first port a local anti-congestion response message sent from a sink device, wherein the local anti-congestion response message is sent after the sink device determines that the length of data cached in a port sending queue for a second port of the sink device corresponding to the first port exceeds a threshold; and suspending, by the source device, sending of a data packet which needs to be sent to the second port through the first port. Hop-by-hop congestion control for the data packets of nodes in a content centric networking (CNN) is timely and accurately realized.

9 Claims, 6 Drawing Sheets

(51) Int. Cl.
*H04L 12/66* (2006.01)
*H04L 29/08* (2006.01)
H04L 12/825 (2013.01)
H04L 12/835 (2013.01)

(52) U.S. Cl.
CPC ........ *H04L 67/2842* (2013.01); *H04L 67/327* (2013.01); *H04L 47/17* (2013.01); *H04L 47/26* (2013.01); *H04L 47/30* (2013.01)

(56) References Cited

U.S. PATENT DOCUMENTS

| | | | |
|---|---|---|---|
| 2008/0273465 | A1 | 11/2008 | Gusat et al. |
| 2010/0061238 | A1* | 3/2010 | Godbole ................ H04L 47/11 370/235 |
| 2010/0157797 | A1* | 6/2010 | Dinescu ................ H04L 47/10 370/230.1 |
| 2010/0195655 | A1 | 8/2010 | Jacobson et al. |
| 2012/0317643 | A1 | 12/2012 | Kim |
| 2013/0294236 | A1* | 11/2013 | Beheshti-Zavareh ........................ H04L 47/22 370/235 |

FOREIGN PATENT DOCUMENTS

| | | |
|---|---|---|
| CN | 101018418 A | 8/2007 |
| CN | 101253729 A | 8/2008 |
| CN | 102025617 A | 4/2011 |
| CN | 102223675 A | 10/2011 |

OTHER PUBLICATIONS

Oueslati et al., "Flow-aware traffic control for a content-centric network," 2012 Proceedings IEEE INFOCOM, Orlando, Florida, pp. 2417-2425, Institute of Electrical and Electronics Engineers, New York, New York (Mar. 25-30, 2012).

Carofiglio et al., "Joint Hop-by-hop and Receiver-Driven Interest Control Protocol for Content-Centric Networks," ICN '12, Helsinki, Finland, pp. 37-42, Association for Computing Machinery, New York, New York (Aug. 17, 2012).

* cited by examiner

CONGESTION METHOD, DEVICE AND SYSTEM

CROSS REFERENCE OF RELATED APPLICATION

This application is a continuation of International Patent Application No. PCT/CN2014/079907, filed on Jun. 16, 2014, which claims the priority to Chinese Patent Application No. 201310277336.8, filed on Jul. 3, 2013, both of which are hereby incorporated by reference in their entireties.

FIELD

The present application relates to the field of wireless communication technology, particularly to a congestion control method, a device and a system.

BACKGROUND

It is considered that the future network should be directly based on content-based naming and routing in content centric networking (referred to as CCN). As a common criterion for the CCN, content is uniquely identified, routed and obtained based on the name of the content, irrelevant to the position of the content.

There is very few transmission control mechanism for the CCN network. A stream control protocol in a user request driven mode is used in the CCN network, and the stream control protocol is based on continuous package requests stream which triggers continuous acquiring of data packets. Since a CCN network node has a function of cache, data received by a requester may be from a data source, or caches of a node on a request path. In this case, data packets of same content are received in various ways, e.g., the data packets are received from multiple different nodes with different round trip time (referred to as RTT). Thus bursts of traffic may occur on CCN network nodes, and caches of the CCN network nodes are filled up with burst data packets, and data packets coming later have to be discarded, which cause severe network congestion.

SUMMARY

A congestion control method, a device and a system are provided in the embodiments of the disclosure, in order to perform timely and accurately congestion control on a CCN network node when bursts of traffic occur on the CCN network node.

In a first aspect, a congestion control method is provided in the embodiments of the disclosure. The method includes: receiving, by a source device, through a first port a local anti-congestion response message sent from a sink device, where the local anti-congestion response message is sent after the sink device determines that the length of data cached in a port sending queue for a second port of the sink device corresponding to the first port exceeds a threshold; and suspending, by the source device, sending a data packet which needs to be sent to the second port through the first port.

Combining with the first aspect, in a first possible implementation of the first aspect, suspending, by the source device, sending the data packet which needs to be sent to the second port through the first port includes:

setting, by the source device, a state of a port sending queue for the first port as an anti-congestion state; and in a case that the port sending queue for the first port is in the anti-congestion state, acquiring, by the source device, time to live TTL corresponding to the data packet which needs to be sent to the second port through the first port, from a pending content PCT, and sending the data packet to the second port through the first port upon reaching the TTL, where the time to live is a lifetime of a request packet for the data packet received from the sink device.

Combining with the first aspect and the first possible implementation of the first aspect, in a second possible implementation of the first aspect, the method further includes:

receiving, by the source device, through the first port a local normal response message sent from the sink device through the second port, where the local normal response message is sent after the sink device determines that the length of the data cached in a port sending queue for the second port does not exceed the threshold and the sink device has already sent the local anti-congestion response message to the first port; and restoring, by the source device, the state of the port sending queue for the first port to a normal send state.

Combining with the first and second possible implementations of the first aspect, in a third possible implementation of the first aspect, the method further includes:

receiving, by the source device, through the first port a request packet sent from the sink device through the second port, detecting whether the length of the data cached in the port sending queue for the first port exceeds the threshold in a case that a data packet corresponding to the request packet is stored locally;

storing information of the data packet, time to live TTL corresponding to the data packet, and port information of the first port into the pending content table PCT, if the length of the data cached in the port sending queue for the first port exceeds the threshold;

detecting whether the port sending queue for the first port is in the anti-congestion state, if the length of the data cached in the port sending queue for the first port does not exceed the threshold;

storing the information of the data packet, the time to live TTL corresponding to the data packet, and the port information of the first port into the PCT, if the port sending queue for the first port is in the anti-congestion state; storing the data packet in the port sending queue for the first port directly, if the port sending queue for the first port is not in the anti-congestion state.

In a second aspect, a source device is provided in the embodiments of the disclosure. The source device includes:

a message receiving module, configured to receive through a first port a local anti-congestion response message sent from a sink device, where the local anti-congestion response message is sent after the sink device determines that the length of data cached in a port sending queue for a second port of the sink device corresponding to the first port exceeds a threshold; and a sending queue caching management module, configured to suspend sending a data packet which needs to be sent to the second port through the first port.

Combining with the second aspect, in a first possible implementation of the second aspect, the sending queue caching management module is configured to:

set a state of a port sending queue for the first port as an anti-congestion state; and in a case that the port sending queue for the first port is in the anti-congestion state, acquire time to live TTL corresponding to the data packet which needs to be sent to the second port through the first port, from a pending content PCT, and send the data packet to the second port through the first port upon reaching the TTL, where the time to live is a lifetime of a request packet for the data packet received by the sink device.

Combining with the second aspect and the first possible implementation of the second aspect, in a second possible implementation of the second aspect, the message receiving module is further configured to receive through the first port a local normal response message sent from the sink device through the second port, where the local normal response message is sent after the sink device determines that the length of the data cached in the port sending queue for the second port does not exceed the threshold and the sink device has already sent the local anti-congestion response message to the first port; and the sending queue caching management module is further configured to restore the state of the port sending queue for the first port to a normal send state.

Combining with the first and second possible implementations of the second aspect, in a third possible implementation of the second aspect, the message receiving module is further configured to receive through the first port a request packet sent from the sink device through the second port, the source device further includes:

a processing module, configured to:

detect whether the length of data cached in the port sending queue for the first port exceeds the threshold in a case that a data packet corresponding to the request packet is stored locally;

store information of the data packet, time to live TTL corresponding to the data packet, and port information of the first port into the pending content table PCT, if the length of the data cached in the port sending queue for the first port exceeds the threshold;

detect whether the port sending queue for the first port is in the anti-congestion state, if the length of the data cached in the port sending queue for the first port does not exceed the threshold;

store the information of the data packet, the time to live TTL corresponding to the data packet, and the port information of the first port into the PCT, if the port sending queue for the first port is in the anti-congestion state; store the data packet in the port sending queue for the first port directly, if the port sending queue for the first port is not in the anti-congestion state.

In a third aspect, a network system is provided in the embodiments of the disclosure. The network system includes at least one source device and at least one sink device;

the sink device is configured to send a local anti-congestion response message after it is determined that the length of data cached in a port sending queue for a second port of the sink device corresponding to a first port exceeds a threshold; and the source device is configured to receive through the first port the local anti-congestion response message sent from the sink device, and suspend sending a data packet which needs to be sent to the second port through the first port.

Combining with the third aspect, in a first possible implementations of the third aspect, the source device, which is configured to suspend sending the data packet which needs to be sent to the second port through the first port, is configured to:

set a state of a port sending queue for the first port as the anti-congestion state;

in a case that the port sending queue for the first port is in the anti-congestion state, acquire time to live TTL corresponding to the data packet which needs to be sent to the second port through the first port, from a pending content table PCT; and send the data packet to the second port through the first port upon reaching the TTL, where the time to live is a lifetime of a request packet for the data packet received by the sink device.

Combining with the third aspect and the first possible implementation of the third aspect, in a second possible implementation of the third aspect, the sink device is further configured to: send a local normal response message after it is determined that the length of the data cached in the port sending queue for the second port does not exceed the threshold and the sink device has already sent the local anti-congestion response message to the first port; and the source device is further configured to receive through the first port the local anti-congestion response message sent from the sink device through the second port, and restore the state of the port sending queue for the first port to a normal send state.

Combining with the first and second possible implementations of the third aspect, in a third possible implementation of the third aspect, the sink device is further configured to send a request packet through the second port; and the source device is further configured to:

receive through the first port the request packet sent from the sink device;

detect whether the length of the data cached in the port sending queue for the first port exceeds the threshold in a case that a data packet corresponding to the request packet is stored locally;

store information of the data packet, time to live TTL corresponding to the data packet, and port information of the first port into the pending content table PCT, if the length of the data cached in the port sending queue for the first port exceeds the threshold;

detect whether the port sending queue for the first port is in the anti-congestion state, if the length of the data cached in the port sending queue for the first port does not exceed the threshold;

store the information of the data packet, the time to live TTL corresponding to the data packet, and the port information of the first port into the PCT, if the port sending queue for the first port is in the anti-congestion state;

store data packet into the port sending queue for the first port directly, if the port sending queue for the first port is not in the anti-congestion state.

In the congestion control method, the device and the system according to the embodiments of the disclosure, after determining that the length of the data cached in the port sending queue for the second port exceeds the threshold, the sink device sends the local anti-congestion response message to the first port of the source device corresponding to the second port, to notify the source device that the sink device is in the congestion state, and stops receiving data packets which are sent from the source device to the second port. The source device receives the local anti-congestion response message sent from the sink device, sets the state of the port sending queue for the first port corresponding to the second port as the anti-congestion state, and suspends sending the data packet which need to be sent to the second port through the first port. Hop-by-hop congestion control is achieved when massive data packet traffic occurs in the CCN network node device, and severe network congestion in case of bursts of data packet traffic on the CCN network node is alleviated.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, the drawings described hereinafter are some embodiments of the disclosure, and other drawings may be obtained by those skilled in the art according to these drawings without creative effort.

DETAILED DESCRIPTION OF THE EMBODIMENTS

To make the objective, technical solution and merits of the disclosure more clearly, the technical solution according to the embodiments of the disclosure is described clearly and comprehensively in conjunction with drawings hereinafter. Apparently, the described embodiments are just part of rather than all of the embodiments of the disclosure. All other embodiments obtained by those skilled in the art based on the embodiments of the disclosure without any creative work fall within the protection scope of the disclosure.

Figure 1:
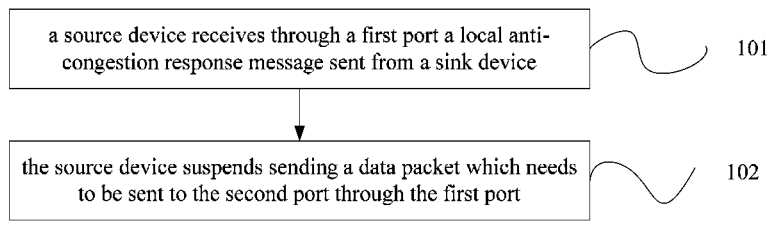
FIG. 1 is a flow chart of a congestion control method according to a first embodiment of the disclosure.

FIG. 1 is a flow chart of a congestion control method according to a first embodiment of the disclosure. The embodiment is performed by a source device on a CCN network node, and the device may be implemented through software and/or hardware. The solution according to the embodiment is applied to a CCN network node, and congestion control on the CCN network node can be performed timely and accurately, in the case that bursts of traffic occurs on the CCN network node. As shown in FIG. 1, the method according to the embodiment may include steps 101 to 102.

In step 101, a source device receives through a first port a local anti-congestion response message sent from a sink device.

A CCN network is essentially a point-to-multipoint network, a stream control protocol in a user request driven mode is used in the CCN network, and the stream control protocol is based on continuous package requests and triggers continuous acquiring of data packets. The CCN network node may serve as both a source device and a sink device. Since the CCN network node has a function of cache, data packets received by the sink device may be from a data source, or may be from caches of some network nodes on a request path, i.e., data packets received by the sink device may be from multiple different source devices.

Specifically, the local anti-congestion response message is sent in the case that the sink device determines that the length of the port sending queue for a second port corresponding to the first port of the sink device exceeds a threshold. It indicates that the port sending queue cache for the second port is filled up with data packets in this case and the second port is in a congestion state, then the local anti-congestion response message is sent to the first port of the source device corresponding to the second port. In this case, the first port of the source device suspends the sending data packets to the corresponding second port of the sink device.

In step 102, the source device suspends sending a data packet which needs to be sent to the second port through the first port.

Specifically, after the first port of the source device corresponding to the second port receives the local anti-congestion response message sent from the sink device which indicates that the sink device is in the congestion state, the source device sets the state of a port sending queue for the first port corresponding to the second port as the anti-congestion state. In this case, it is required to suspend sending the data packet which needs to be sent to the second port through the first port, and data packet traffic of the sink device is reduced.

It should be noted that, according to the embodiment of the disclosure, the sink device may serve as a source device, and the source device may also serve as a sink device.

According to the embodiment, after determining that the length of the data cached in the port sending queue for the second port exceeds the threshold, the sink device sends the local anti-congestion response message to the first port of the source device corresponding to the second port to notify the source device that the sink device is in the congestion state at this moment, and stops receiving the data packets which are sent from the source device to the second port. The source device sets the state of the port sending queue for the first port corresponding to the second port as the anti-congestion state, and suspends sending the data packet which needs to be sent to the second port through the first port. Congestion control is achieved in the case that high data packet traffic occurs in the CCN network node device, and severe network congestion is solved in the case that bursts of data packet traffic occurs on the CCN network node.

Figure 2:
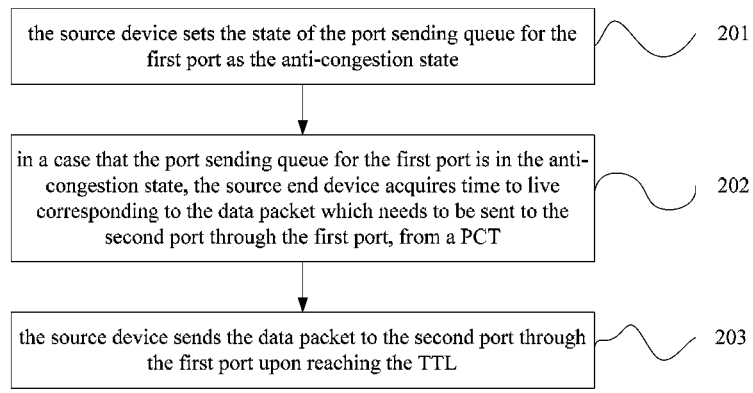
FIG. 2 is a flow chart of a congestion control method according to a second embodiment of the disclosure.

FIG. 2 is a flow chart of a congestion control method according to a second embodiment of the disclosure. In the anti-congestion state, the source device suspends sending the data packet which needs to be sent to the second port through the first port according to the first method embodiment as shown in FIG. 1. The method may be implemented through steps 201 to 203.

In step 201, the source device sets the state of the port sending queue for the first port as the anti-congestion state.

In step 202, in a case that the port sending queue for the first port is in the anti-congestion state, the source end device acquires time to live (referred to as TTL) corresponding to the data packet which needs to be sent to the second port through the first port, from a pending content table (referred to as PCT).

Specifically, TTL corresponding to data packets is stored in the PCT, where the time to live TTL is a lifetime of a request packet for the data packet received from a sink device. For example, the TTL of the request packet is stored in a pending interest table (referred to as PIT), each of the request packets carries the TTL to limit amounts of PIT cache information for the PIT, and timeout request packet information is deleted from the PIT, consequently, a sequent data packet is discarded.

In step 203, the source device sends the data packet to the second port through the first port upon reaching the TTL.

Specifically, upon reaching the TTL, the source device sends the data packets to the second port through the first port, regardless of whether the length of the data cached in the port sending queue for the second port of the sink device exceeds the threshold, i.e., regardless of whether the second port of the sink device is in the congestion state. A record in the PCT is deleted once the TTL is exceeded.

According to the embodiment, the source device sets the state of the port sending queue for the first port as the anti-congestion state; and in a case that the port sending queue for the first port is in the anti-congestion state, the source device acquires the TTL corresponding to the data packet which needs to be sent to the second port through the first port, from the PCT. Upon reaching the TTL, the source device sends the data packet to the second port through the first port, to ensure that the data packet is sent to the second port within the TTL of the data packet and to avoid packet loss in the source end device.

Figure 3:
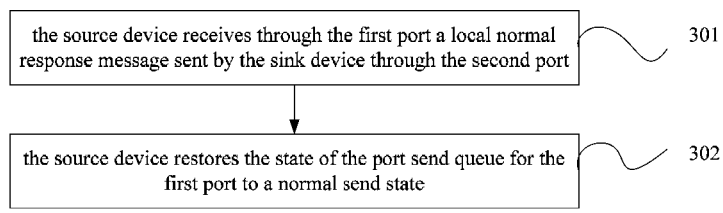
FIG. 3 is a flow chart of a congestion control method according to a third embodiment of the disclosure.

FIG. 3 is a flow chart of a congestion control method according to a third embodiment of the disclosure. Based on the method embodiments shown in FIG. 1 and FIG. 2, the method according to this embodiment further includes steps 301 to 302.

In step 301, the source device receives through the first port a local normal response message sent by the sink device through the second port.

Specifically, the local normal response message is sent in the case that the sink device determines that length of data cached in a port sending queue for the second port does not exceed the threshold and the sink device already sends the local anti-congestion response message to the first port.

In step 302, the source device restores the state of the port sending queue for the first port to a normal send state.

According to the embodiment, in the case that the sink device determines that the length of data cached in the port sending queue for the second port does not exceed the threshold and the sink device already sends the local anti-congestion response message to the first port of the source device corresponding to the second port, the sink device sends the local normal response message to the first port of the source device corresponding to the second port, to notify the source device that the sink device is in the non-congestion state and can receive a data packet. The source device restores the state of the port sending queue for the first port to the normal send state, which may timely prevent the congestion on the source device timely.

Figure 4:
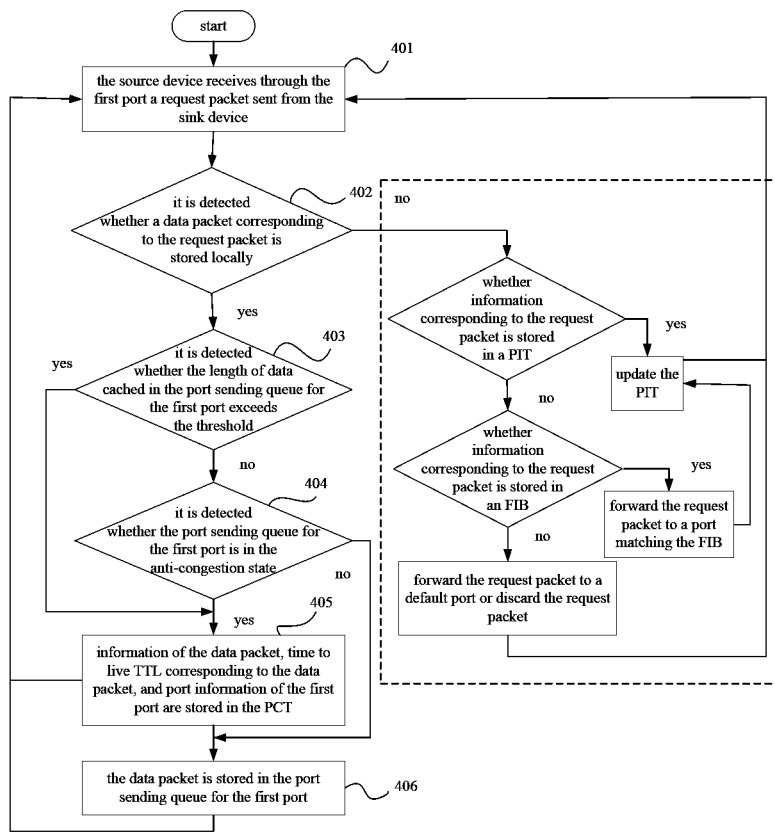
FIG. 4 is a flow chart of a congestion control method according to a fourth embodiment of the disclosure.
Figure 5:
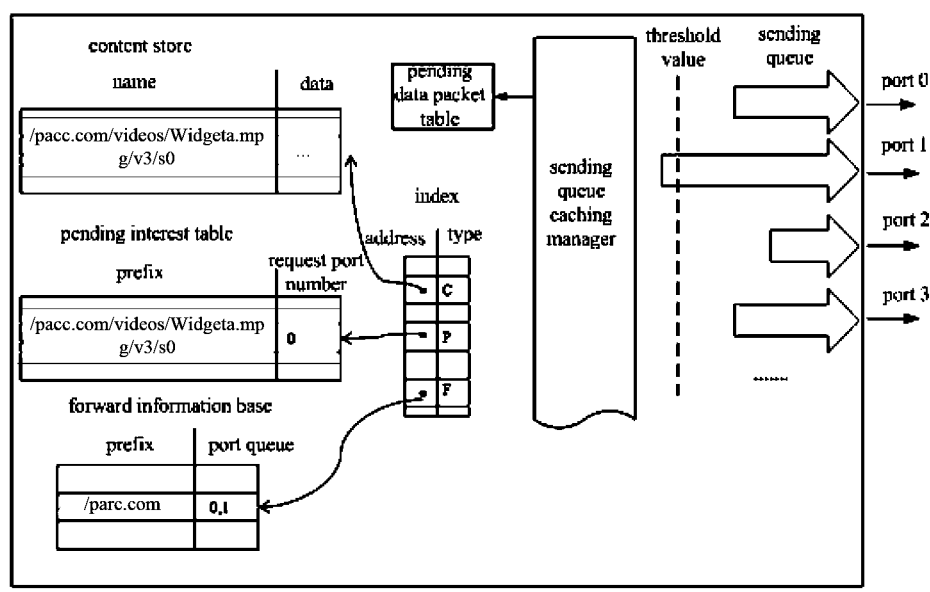
FIG. 5 is a function diagram of a source device according to the embodiment shown in FIG. 4.

FIG. 4 is a flow chart of a congestion control method according to a fourth embodiment of the disclosure. FIG. 5 is a function diagram of the source device according to the embodiment shown in FIG. 4. The embodiment is performed by a source device on a CCN network node, and the device may be implemented through software and/or hardware. The solution according to the embodiment is applied to the CCN network node. As shown in FIG. 4 and FIG. 5, based on the method embodiments shown in FIG. 1 and FIG. 2, the method according to the embodiment may include steps 401 to 406.

In step 401, the source device receives through the first port a request packet sent from the sink device.

In step 402, it is detected whether a data packet corresponding to the request packet is stored locally; if a data packet corresponding to the request packet is stored locally, it is proceeded to step 403; and if no data packet corresponding to the request packet is stored locally, the process flow for subsequent request packets is the same as the process flow for a conventional CCN network node.

Specifically, as shown in FIG. 5, it may be detected whether there is a data packet corresponding to the request packet in CS, the process flow for subsequent request packets such as flow in a dashed box in FIG. 4 is the same as the process flow for the conventional CCN network node, and related functional modules are shown in FIG. 5, which are not repeated herein.

In step 403, it is detected whether the length of data cached in the port sending queue for the first port exceeds the threshold; if the length of data cached in the port sending queue for the first port exceeds the threshold, it is proceeded to step 405; if the length of data cached in the port sending queue for the first port does not exceed the threshold, it is proceeded to step 404.

Specifically, a corresponding data packet is sent from a port where the request packet is received, and in this case it is required to detect whether the length of data cached in the port sending queue for the first port exceeds the threshold, and to determine whether the first port is in the congestion state. If the first port is in the congestion state, it is proceeded to step 405.

In step 404, it is detected whether the port sending queue for the first port is in the anti-congestion state; if the port sending queue for the first port is in the anti-congestion state, it is proceeded to step 405; if the port sending queue for the first port is not in the anti-congestion state, it is proceeded to step 406.

Specifically, if the length of data cached in the port sending queue for the first port does not exceed the threshold, it is detected whether the port sending queue for the first port is in the anti-congestion state; and if the port sending queue for the first port is not in the anti-congestion state, the data packet is stored into the port sending queue for the first port and sent out, otherwise it is proceeded to step 405.

In step 405, information of the data packet, time to live TTL corresponding to the data packet, and port information of the first port are stored in the PCT.

Specifically, if the length of the data cached in the port sending queue for the first port exceeds the threshold and the first port is in the congestion state, it is required to store information of the data packet in the PCT, the data packet is not processed in this case, and it is returned to step 401. In the subsequent process, if it is detected that the length of data cached in the port sending queue for the port does not exceed the threshold, the data packet is stored into the port sending queue for the port, and it is proceeded to step 404. The record of a data packet in the PCT is deleted once the time to live TTL corresponding to the data packet is exceeded. If the port is in the anti-congestion state, the information of the data packet, the time to live TTL corresponding to the data packet, and the port information of the first port are stored in the PCT, the data packet is stored into the port sending queue for the first port and is suspended to be sent, as described in the embodiment shown in FIG. 2.

For example, a structure of the PCT may be a table structure as follows.

| PCT table | | |
|---|---|---|
| name | TTL | port number |
| /parc.com/videos/WidgetA.mpg/v3/s0 | 3 ms | 0 |
| ... | | ... | where the name field is used to store name information of pending data packets;

the TTL field is used to store TTL in a PIT for request packets corresponding to data packets;

the port number field is used to store port numbers of port sending queues where the data packets locates, or port numbers to be sent to the port sending queues.

In step 406, the data packet is stored in the port sending queue for the first port.

According to the embodiment, the source device receives through the first port the request packet which is sent from the second port of the sink device; and if a data packet corresponding to the request packet is stored locally, it is detected whether the length of data cached in the port sending queue for the first port of the source device exceeds the threshold. If the length of the data cached in the port sending queue for the first port of the source device exceeds the threshold, the information of the data packet, the time to live TTL corresponding to the data packet, and the port information of the first port are stored in the PCT, and the data packet is not processed. If the length of the data cached in the port sending queue for the first port of the source device does not exceed the threshold, it is further detected whether the port sending queue for the first port of the source device is in the anti-congestion state. If the port sending queue for the first port of the source device is in the anti-congestion state, the information of the data packet, the time to live TTL corresponding to the data packet, and the port information of the first port are stored in the PCT, and the data packet is stored into the port sending queue for the first port and is suspended to be sent; if the port sending queue for the first port is not in the anti-congestion state, the data packet is stored into the port sending queue for the first port and sent out. Hop-by-hop congestion control may be achieved timely in the case that a large data packet traffic arise in a CCN network node device.

Figure 6:
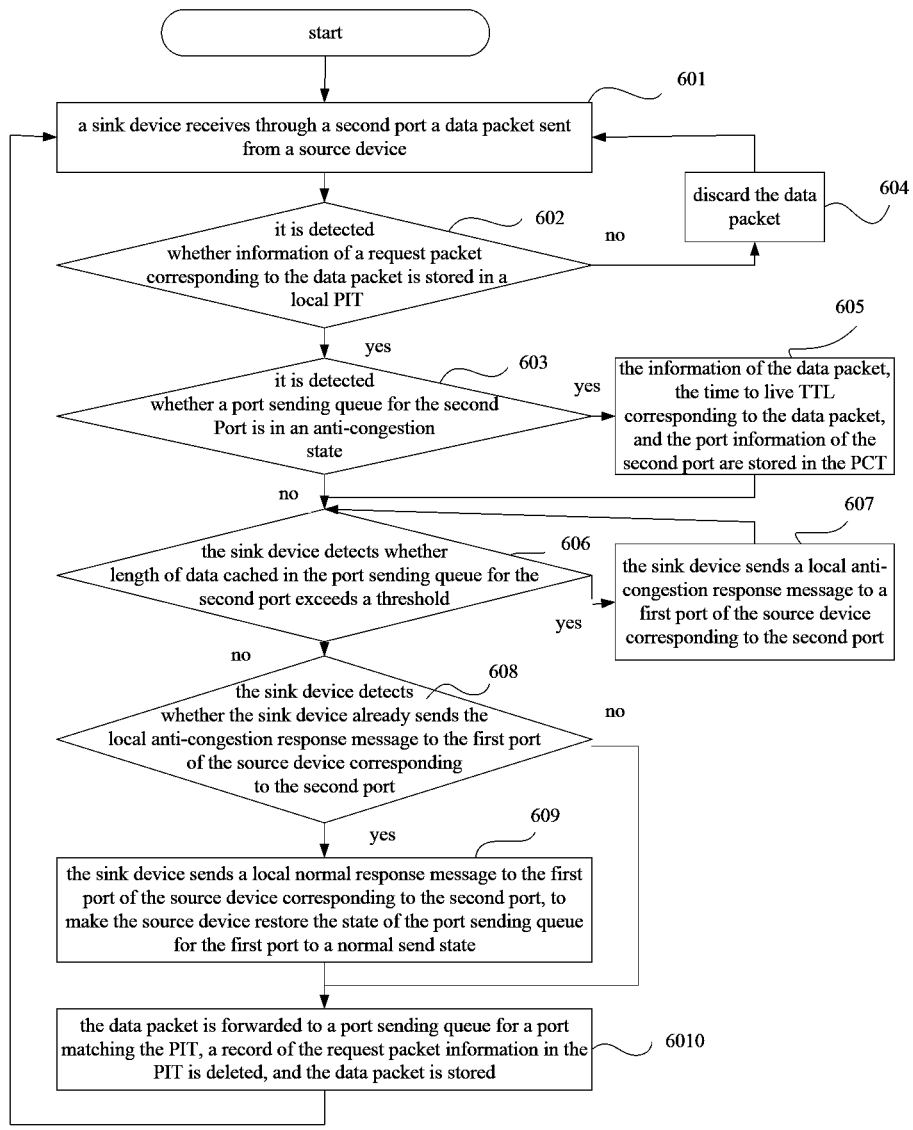
FIG. 6 is a flow chart of a congestion control method according to a fifth embodiment of the disclosure.
Figure 7:
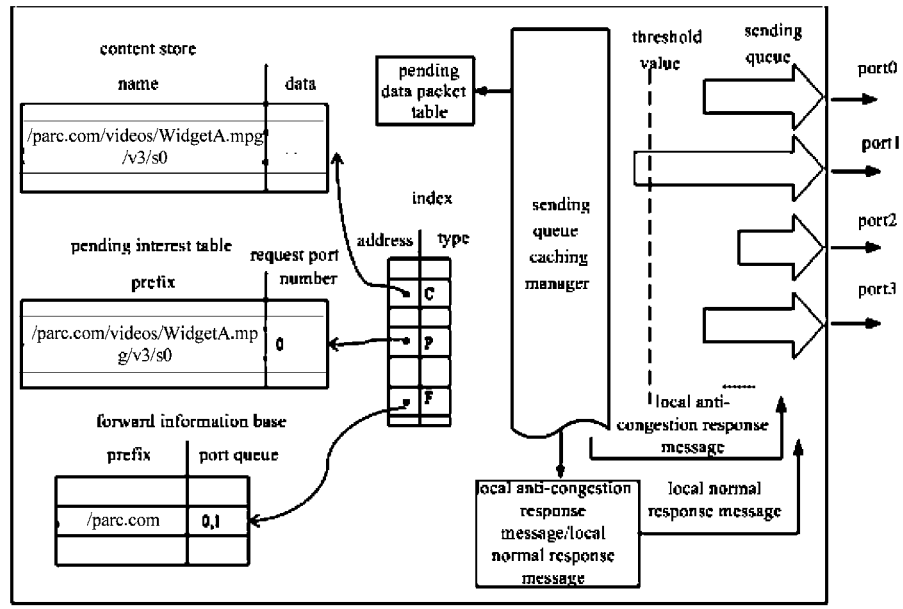
FIG. 7 is a function diagram of a sink device according to the embodiment shown in FIG. 6.

FIG. 6 is a flow chart of a congestion control method according to a fifth embodiment of the disclosure, and FIG. 7 is a function diagram of a sink device according to the embodiment shown in FIG. 6. The embodiment is performed by a source device on a CCN network node, and the device may be implemented through software and/or hardware. The solution according to the embodiment is applied to the CCN network node. As shown in FIG. 6 and FIG. 7, the method according to the embodiment may include steps 601 to 6010.

In step 601, a sink device receives through a second port a data packet sent from a source device.

In step 602, it is detected whether information of a request packet corresponding to the data packet is stored in a local PIT; and the information of the request packet corresponding to the data packet is stored in the local PIT, it is proceeded to step 603; if no information of the request packet corresponding to the data packet is stored in the local PIT, it is proceeded to step 604.

Specifically, as shown in FIG. 6, TTL of the request packet, name prefixes of the second port sending the request and the request packet, etc., may be stored in the PIT, in order to perform an operation on a data packet responding to the request packet in the subsequent process. If no information of the request packet matching the data packet is stored in the local PIT, the data packet is discarded.

In step 603, it is detected whether a port sending queue for the second port is in an anti-congestion state; and if the port sending queue for the second port is in the anti-congestion state, it is proceeded to step 605; if the port sending queue for the second port is not in the anti-congestion state, it is proceeded to step 606.

Specifically, if there is the information of the request packet corresponding to the data packet, it is detected whether the port sending queue for the second port is in the anti-congestion state. If the port sending queue for the second port is in the anti-congestion state, information of the data packet, time to live TTL corresponding to the data packet, and port information of the second port are stored in the PCT and the sending of data packet is suspended; if the port sending queue for the second port is not in the anti-congestion state, it is proceeded to step 606.

In step 604, the data packet is discarded.

It is returned to step 601, to continue to receive data packets.

In step 605, the information of the data packet, the time to live TTL corresponding to the data packet, and the port information of the second port are stored in the PCT.

As shown in FIG. 7, PCT may be used to record information related to a delayed data packet in the port sending queue, etc.

In step 606, the sink device detects whether length of data cached in the port sending queue for the second port exceeds a threshold; and if the length of the data cached in the port sending queue for the second port exceeds the threshold, it is proceeded to step 607; if the length of the data cached in the port sending queue for the second port does not exceed the threshold, it is proceeded to step 608.

In step 607, the sink device sends a local anti-congestion response message to a first port of the source device corresponding to the second port.

In this case, the sink device is already in a congestion state and notifies the source device that the sink device is in the congestion state, then the source device sets a state of the port sending queue for the first port corresponding to the second port as the anti-congestion state, and suspend sending the data packet which need to be sent to the second port through the first port in the anti-congestion state, and it is proceeded to step 606.

In step 608, the sink device detects whether the sink device already sends the local anti-congestion response message to the first port of the source device corresponding to the second port; and if the sink device already sends the local anti-congestion response message to the first port of the source device corresponding to the second port, it is proceeded to step 609; if the sink device does not send the local anti-congestion response message to the first port of the source device corresponding to the second port, it is proceeded to step 6010.

Specifically, if the sink device detects that the length of the data cached in the port sending queue for the second port does not exceed the threshold, the sink device detects whether the local anti-congestion response message is already sent to the first port of the source device corresponding to the second port, and notifies the source device that the sink device is in the non-congestion state and the sink device can receive the data packet sent from the source device.

In step 609, the sink device sends a local normal response message to the first port of the source device corresponding to the second port, to make the source device restore the state of the port sending queue for the first port to a normal send state.

Specifically, as shown in FIG. 7, a recorder for the local normal response message/the local anti-congestion response message may be configured to, after the sink device determines that the length of the data cached in the port sending queue for the second port exceeds the threshold, record the port information of the second port through which the local anti-congestion response message is sent to the first port of the source device corresponding to the second port. Thus, in the case that the port sending queue for the second port is in the normal state, the second port sends the local normal response message to the first port corresponding to the second port. The local normal response message is sent to notify the source device that the sink device is in the non-congestion state, to make the source device restore the state of the port sending queue for the first port to the normal send state, and control the data packet in the source device timely. The case that massive data packets are stored in the source device can be avoided, and the congestion is avoided as soon as possible.

In step 6010, the data packet is forwarded to a port sending queue for a port matching the PIT, a record of the request packet information in the PIT is deleted, and the data packet is stored.

Specifically, if the port sending queue for the second port is not in the anti-congestion state, and the length of the data cached in the port sending queue for the second port does not exceed the threshold, the data packet is forwarded to the port sending queue for the port matching the PIT, and the corresponding record in the PIT is deleted, which represents that the request of the request packet is accomplished, and the data packet is stored in a local data packet store (referred to as CS).

As shown in FIG. 7, a sending queue caching manager may be configured to perform operations in step 603 and step 606, set and record the state of the port sending queue.

A forward information base (referred to as FIB) in FIG. 7 is configured to record information of a forwarded request packet, such as the second port and a name prefix.

It should be noted that, step 608 and step 6010 may be executed simultaneously.

In this embodiment, if the sink device detects that the length of the data cached in the port sending queue for the second port does not exceed the threshold, and the sink device already sends the local anti-congestion response message to the first port of the source device corresponding to the second port, the sink device sends the local normal response message to the first port of the source device corresponding to the second port, notifies the source device that the sink device is in the non-congestion state and the sink device can receive the data packet, to make the source device restore the state of the port sending queue for the first port to the normal send state. Congestion in the source end device can be avoided as soon as possible.

Figure 8:
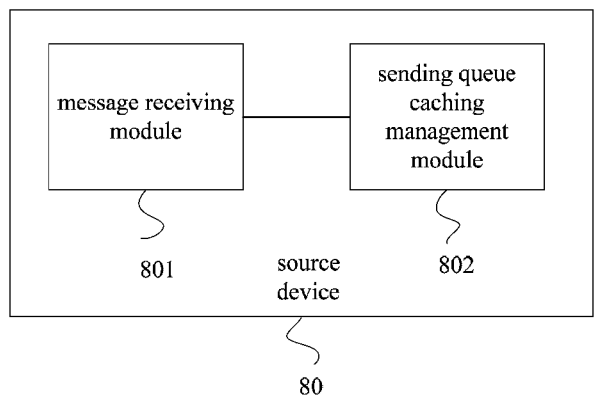
FIG. 8 is a structure diagram of a source device for congestion control according to a first embodiment of the disclosure.

FIG. 8 is a structure diagram of a source device for congestion control according to a first embodiment of the disclosure. As shown in FIG. 8, the source device 80 according to the embodiment of the disclosure may include a message receiving module 801 and a sending queue caching management module 802. The message receiving module 801 is configured to receive a local anti-congestion response message sent from a sink device through a first port, where the local anti-congestion response message is sent in the case that the sink device determines that the length of data cached in a port sending queue for a second port of the sink device corresponding to the first port exceeds a threshold; the sending queue caching management module 802 is configured to suspend sending a data packet which needs to be sent to the second port through the first port.

The device according to this embodiment may be configured to implement the technical solution in the method embodiment shown in FIG. 1, and realization principles and technical effects are similar, which are not repeated herein.

In a source end device for congestion control according to a second embodiment of the disclosure, based on the embodiment shown in FIG. 8, the sending queue caching management module 802 is further configured to:

set the state of the port sending queue for the first port as an anti-congestion state; and in a case that the port sending queue for the first port is in the anti-congestion state, acquire time to live TTL corresponding to the data packet which needs to be sent to the second port through the first port, from a pending content table PCT, and send the data packet to the second port through the first port upon reaching the TTL, where the time to live TTL is a lifetime of a request packet for the data packet received by the sink device.

The device according to this embodiment may be configured to implement the technical solution in the method embodiment shown in FIG. 2, and realization principles and technical effects are similar, which are not repeated herein.

In a source device for congestion control according to a third embodiment of the disclosure, based on the source device for congestion control according to the first and second embodiments of the disclosure, the message receiving module 801 is further configured to receive through the first port the local normal response message sent by the sink device through the second port, where the local normal response message is sent in the case that the sink device determines that the length of the data cached in a port sending queue for the second port does not exceed a threshold and the sink device already sends the local anti-congestion response message to the first port; and the sending queue caching management module 802 is further configured to restore the state of the port sending queue for the first port to a normal send state.

The device according to this embodiment may be configured to implement the technical solution in the method embodiment shown in FIG. 3, and realization principles and technical effects are similar, which are not repeated herein.

Figure 9:
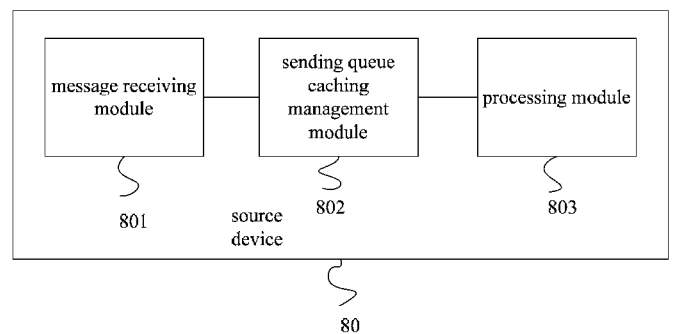
FIG. 9 is a structure diagram of a source device for congestion control according to a fourth embodiment of the disclosure.

FIG. 9 is a structure diagram of a source end device for congestion control according to a fourth embodiment of the disclosure. As shown in FIG. 9, based on the source end device for congestion control according to the first to third embodiment of the disclosure, the message receiving module 801 is further configured to receive through the first port a request packet sent from the sink device through the second port.

The source device 80 according to the embodiment may further include a processing module 803, configured to detect whether the length of the data cached in the port sending queue for the first port exceeds the threshold in a case that data packet corresponding to the request packet is stored locally; and if the length of the data cached in the port sending queue for the first port exceeds the threshold, information of the data packet, time to live TTL corresponding to the data packet, and port information of the first port are stored into the pending content table PCT; if the length of the data cached in the port sending queue for the first port does not exceed the threshold, it is detected whether the port sending queue for the first port is in the anti-congestion state; and the port sending queue for the first port is in the anti-congestion state, the information of the data packet, the time to live TTL corresponding to the data packet, and the port information of the first port are stored into the PCT; if the port sending queue for the first port is not in the anti-congestion state, the data packet is stored in the port sending queue for the first port.

The device according to this embodiment may be configured to implement the technical solution in the method embodiment shown in FIG. 4, and realization principles and technical effects are similar, which are not repeated herein.

Figure 10:
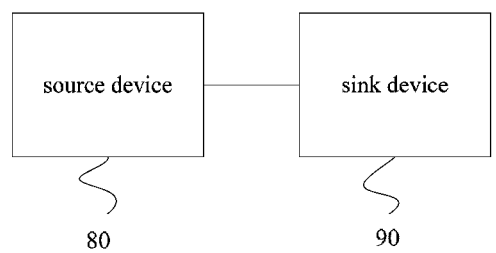
FIG. 10 is a structure diagram of a CCN network system according to a first embodiment of the disclosure.

FIG. 10 is a structure diagram of a CCN network system according to a first embodiment of the disclosure. As shown in FIG. 10, the network system according to the embodiment includes at least one source device 80 and at least one sink device 90. The sink device 90 is configured to send a local anti-congestion response message in the case that it is determined that length of data cached in a port sending queue for a second port of the sink device corresponding to a first port exceeds a threshold. The source device 80 is configured to receive through the first port the local anti-congestion response message sent from the sink device, and suspend sending data packet which needs to be sent to the second port through the first port. Realization principles and technical effects are similar, and are not repeated herein.

In a CCN network system according to a second embodiment of the disclosure, based on the embodiment shown in FIG. 10, the source device 80 is further configured to suspend sending the data packet which needs to be sent to the second port through the first port, which may be implemented in this way:

the source device 80 is configured to set the state of a port sending queue for the first port as the anti-congestion state; in a case that the port sending queue for the first port is in the anti-congestion state, acquire time to live TTL corresponding to the data packet which needs to be sent to the second port through the first port from the pending content table PCT; and send the data packet to the second port through the first port upon reaching the TTL, where the time to live TTL is a lifetime of a request packet for the data packet received by the sink device.

Realization principles and technical effects of the network system according to this embodiment are similar to the technical solution for the method embodiment shown in FIG. 2, which are not repeated herein.

In a CCN network system according to a third embodiment of the disclosure, based on the system according to the first and second embodiment, the sink device 90 is further configured to send a local normal response message after it is determined that the length of the data cached in a port sending queue for the second port does not exceed a threshold and the sink device has already sent the local anti-congestion response message to the first port.

The source device 80 is further configured to receive through the first port the local anti-congestion response message sent from the sink device through the second port, and restore the state of the port sending queue for the first port to a normal send state.

Realization principles and technical effects of the network system according to this embodiment are similar to the technical solution for the method embodiment shown in FIG. 3, which are not repeated herein.

In a CCN network system according to a fourth embodiment of the disclosure, based on the system according to the first to third embodiments, the sink device 90 is further configured to send the request packet through the second port.

The source device 80 is further configured to receive through the first port the request packet sent from the sink device, detect whether the length of the data cached in the port sending queue for the first port exceeds the threshold in a case that a data packet corresponding to the request packet is stored locally; and if the length of the data cached in the port sending queue for the first port exceeds the threshold, store the information of the data packet, time to live TTL corresponding to the data packet, and port information of the first port into the pending content table PCT; if the length of the data cached in the port sending queue for the first port does not exceed the threshold, detect whether the port sending queue for the first port is in the anti-congestion state; and if the port sending queue for the first port is in the anti-congestion state, store the information of the data packet, the time to live TTL corresponding to the data packet, and the port information of the first port into the PCT; if the port sending queue for the first port is not in the anti-congestion state, directly store the data packet into the port sending queue for the first port.

Realization principles and technical effects of the network system according to this embodiment are similar to the technical solution for the method embodiment shown in FIG. 4, which are not repeated herein.

Figure 11:
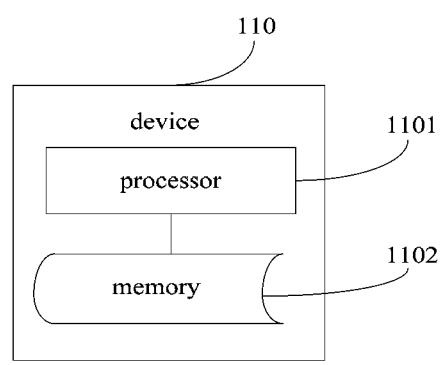
FIG. 11 is a structure diagram of a CCN network node device according to an embodiment of the disclosure.

FIG. 11 is a structure diagram of a CCN network node device according to an embodiment of the disclosure. As shown in FIG. 11, a CCN network node device 110 provided in the embodiment includes a processor 1101 and memory 1102. The memory 1102 stores executable instructions and data, and when the device 110 operates, the processor 1101 communicates with the memory 1102 and calls the executable instructions in the memory 1102 to execute an operation in any method embodiment of the disclosure.

The device according to this embodiment may be configured to implement the technical solution in the congestion control method provided in any embodiment of the disclosure, and realization principles and technical effects are similar, which are not repeated herein.

Those skilled in the art may understand that, all of or a part of the steps implementing the above method embodiments may be accomplished through related hardware instructed by programs. The programs may be stored in a computer readable storage medium. The steps in the above method embodiments are executed during program execution; the storage medium includes various mediums capable of storing procedure codes such as ROM, RAM, disk and compact disc.

It should be noted that, the above embodiments are to illustrate the technical solution of the disclosure and are not to limit the disclosure; though the disclosure is described in detail based on the above embodiments, those skilled in the art should understand that, modifications may be still made to the technical solution recorded in the embodiments, or equivalent replacement may be conducted on all of or a part of the technical features; with these modifications or replacement, the essence of corresponding technology solution does not depart from the scope of the technical solution for the embodiments.

What is claimed is:

1. A congestion control method, comprising:
   receiving, by a source device, through a first port a local anti-congestion response message sent from a sink device, wherein the local anti-congestion response message is sent after the sink device determines that the length of data cached in a port sending queue for a second port of the sink device corresponding to the first port exceeds a threshold; and suspending, by the source device, sending of a data packet which needs to be sent to the second port through the first port, wherein suspending, by the source device, sending the data packet which needs to be sent to the second port through the first port comprises:

setting, by the source device, a state of a port sending queue for the first port as an anti-congestion state; and in a case that the port sending queue for the first port is in the anti-congestion state:

acquiring, by the source device and from a pending content table (PCT), a time to live (TTL) corresponding to the data packet which needs to be sent to the second port through the first port, wherein the TTL is a lifetime of a request packet that corresponds to the data packet and the request packet is received by the source device from the sink device, and sending the data packet to the second port through the first port upon reaching the TTL, and wherein the method further comprises:

receiving, by the source device, through the first port a request packet sent from the sink device through the second port;

detecting whether the length of the data cached in the port sending queue for the first port exceeds the threshold in a case that a data packet corresponding to the request packet is stored locally;

storing information of the data packet, TTL corresponding to the data packet, and port information of the first port into the PCT, if the length of the data cached in the port sending queue for the first port exceeds the threshold;

detecting whether the port sending queue for the first port is in the anti-congestion state, if the length of the data cached in the port sending queue for the first port does not exceed the threshold;

storing the information of the data packet, the TTL corresponding to the data packet, and the port information of the first port into the PCT, if the port sending queue for the first port is in the anti-congestion state; and storing the data packet in the port sending queue for the first port directly, if the port sending queue for the first port is not in the anti-congestion state.

2. The method according to claim 1, further comprising:

receiving, by the source device, through the first port a local normal response message sent from the sink device through the second port, wherein the local normal response message is sent after the sink device determines that the length of the data cached in the port sending queue for the second port does not exceed the threshold and the sink device has already sent the local anti-congestion response message to the first port; and restoring, by the source device, the state of the port sending queue for the first port to a normal send state.

3. The method according to claim 1, wherein the source device is a Content Centric Networking (CCN) network node, and wherein the TTL is stored in a pending interest table (PIT) for the request packet and is further stored correspondingly in the PCT.

4. A source device, comprising:

a memory storing instructions; and a processor in communication with the memory, wherein, when the processor executes the instructions, the processor is configured to cause the source device to:

receive through a first port a local anti-congestion response message sent from a sink device, wherein the local anti-congestion response message is sent after the sink device determines that the length of data cached in a port sending queue for a second port of the sink device corresponding to the first port exceeds a threshold; and suspend sending a data packet which needs to be sent to the second port through the first port, by:

setting a state of a port sending queue for the first port as an anti-congestion state; and in a case that the port sending queue for the first port is in the anti-congestion state:

acquiring, from a pending content table (PCT), a time to live (TTL) corresponding to the data packet which needs to be sent to the second port through the first port, wherein the TTL is a lifetime of a request packet that corresponds to the data packet and the request packet is received by the source device from the sink device, and sending the data packet to the second port through the first port upon reaching the TTL, wherein, when the processor executes the instructions, the processor is further configured to cause the source device to:

receive through the first port a request packet sent from the sink device through the second port;

detect whether the length of data cached in the port sending queue for the first port exceeds the threshold in a case that a data packet corresponding to the request packet is stored locally;

store information of the data packet, TTL corresponding to the data packet, and port information of the first port into the PCT, if the length of the data cached in the port sending queue for the first port exceeds the threshold;

detect whether the port sending queue for the first port is in the anti-congestion state, if the length of data cached in the port sending queue for the first port does not exceed the threshold;

store the information of the data packet, the TTL corresponding to the data packet, and the port information of the first port into the PCT, if the port sending queue for the first port is in the anti-congestion state; and store directly the data packet in the port sending queue for the first port, if the port sending queue for the first port is not in the anti-congestion state.

5. The source device according to claim 4, wherein, when the processor executes the instructions, the processor is configured to cause the source device to:

receive through the first port a local normal response message sent from the sink device through the second port, wherein the local normal response message is sent after the sink device determines that the length of the data cached in the port sending queue for the second port does not exceed the threshold and the sink device has already sent the local anti-congestion response message to the first port; and restore the state of the port sending queue for the first port to a normal send state.

6. The source device according to claim 4, wherein the source device is a Content Centric Networking (CCN) network node, and wherein the TTL is stored in a pending interest table (PIT) for the request packet and is further stored correspondingly in the PCT.

7. A network system, comprising at least one source device and at least one sink device;
wherein:
the sink device is configured to send a local anti-congestion response message after it is determined that the length of data cached in a port sending queue for a second port of the sink device corresponding to a first port exceeds a threshold; and
the source device is configured to receive through the first port the local anti-congestion response message sent from the sink device, and suspend sending a data packet which needs to be sent to the second port through the first port,
wherein the source device, which is configured to suspend sending the data packet which needs to be sent to the second port through the first port, is configured to:
set a state of a port sending queue for the first port as an anti-congestion state; and
in a case that the port sending queue for the first port is in the anti-congestion state:
acquire, from a pending content table (PCT), a time to live (TTL) corresponding to the data packet which needs to be sent to the second port through the first port, wherein the TTL is a lifetime of a request packet that corresponds to the data packet and the request packet is received by the source device from the sink device, and
send the data packet to the second port through the first port upon reaching the TTL,
wherein the sink device is further configured to send a request packet through the second port, and
wherein the source device is further configured to:
receive through the first port the request packet sent from the sink device;

detect whether the length of the data cached in the port sending queue for the first port exceeds the threshold in a case that a data packet corresponding to the request packet is stored locally;
store information of the data packet, TTL corresponding to the data packet, and port information of the first port into the PCT, if the length of the data cached in the port sending queue for the first port exceeds the threshold;
detect whether the port sending queue for the first port is in the anti-congestion state, if the length of the data cached in the port sending queue for the first port does not exceed the threshold;
store the information of the data packet, the TTL corresponding to the data packet, and the port information of the first port into the PCT, if the port sending queue for the first port is in the anti-congestion state; and
store the data packet directly, if the port sending queue for the first port is not in the anti-congestion state.

8. The network system according to claim 7, wherein:
the sink device is further configured to send a local normal response message after it is determined that the length of the data cached in the port sending queue for the second port does not exceed the threshold and the sink device has already sent the local anti-congestion response message to the first port; and
the source device is further configured to receive through the first port the local anti-congestion response message sent from the sink device through the second port, and restore the state of the port sending queue for the first port to a normal send state.

9. The network system according to claim 7,
wherein the source device is a first Content Centric Networking (CCN) network node, and the sink device is a second Content Centric Networking network node, and
wherein the TTL is stored in a pending interest table (PIT) for the request packet and is further stored correspondingly in the PCT.

* * * * *